(12) United States Patent
McDuff et al.

(10) Patent No.: US 10,871,180 B2
(45) Date of Patent: Dec. 22, 2020

(54) WALL-MOUNTED HOOK

(71) Applicant: COBRA ANCHORS CO. LTD., Montreal (CA)

(72) Inventors: Pierre McDuff, Outremont (CA); Alexandre Pollak, Laval (CA); Lang Nguyen, Dollard-des-Ormeaux (CA)

(*) Notice: Subject to any disclaimer, the term of this patent is extended or adjusted under 35 U.S.C. 154(b) by 0 days.

(21) Appl. No.: 16/019,177

(22) Filed: Jun. 26, 2018

(65) Prior Publication Data
US 2019/0063671 A1    Feb. 28, 2019

Related U.S. Application Data

(63) Continuation of application No. 14/949,173, filed on Nov. 23, 2015, now abandoned, which is a (Continued)

(30) Foreign Application Priority Data

Oct. 30, 2008    (CA) ...................................... 2643664

(51) Int. Cl.
*F16B 13/00* (2006.01)
*F16B 13/04* (2006.01)
(Continued)

(52) U.S. Cl.
CPC .............. *F16B 13/002* (2013.01); *A47G 1/20* (2013.01); *F16B 13/04* (2013.01); *F16B 45/00* (2013.01)

(58) Field of Classification Search
CPC ........ F16B 13/001; F16B 13/04; F16B 13/08; F16B 13/0833; F16B 13/0866;
(Continued)

(56) References Cited

U.S. PATENT DOCUMENTS 147,343 A    2/1874 Miles
165,206 A    7/1875 Brown
(Continued)

FOREIGN PATENT DOCUMENTS

CA    1164333    3/1984
CA    2252173    4/2000
(Continued)

*Primary Examiner* — Jonathan Liu
*Assistant Examiner* — Guang H Guan
(74) *Attorney, Agent, or Firm* — Benoit & Cote Inc.; Michel Sofia

(57) ABSTRACT

An anchor assembly for use with hollow panels, comprises a holding member, such as a hook, and an anchor. The anchor is adapted to penetrate a hollow panel, such as a wall, and, once the anchor assembly has been installed to the wall, the anchor is firmly secured thereto while the hook, which is joined to the anchor, is located on a visible side of the wall. The anchor includes a first anchor portion and a second vice portion. The anchor portion, when the anchor assembly is installed to the wall, extends through the hole defined in the wall while the vice portion is located behind the wall. An elbow portion is provided on the anchor between the anchor and vice portions for allowing the anchor to be pivoted when being installed in the wall from a first position where the vice portion is inserted though the wall to form the hole therein and a second position where the vice portion extends behind the wall and in abutment therewith and the anchor portion is lodged in the hole.

4 Claims, 5 Drawing Sheets

Related U.S. Application Data continuation of application No. 13/126,878, filed as application No. PCT/CA2009/001572 on Oct. 30, 2009, now abandoned.

(60) Provisional application No. 61/193,256, filed on Nov. 12, 2008.

(51) Int. Cl.
*F16B 45/00* (2006.01)
*A47G 1/20* (2006.01)

(58) Field of Classification Search
CPC .... F16B 45/00; F16B 25/0026; F16B 25/103; F16B 13/002; A47G 1/20
USPC ...... 248/546, 216.1, 217.3, 217.4, 304, 339; 411/400, 387.1–387.8, 344
See application file for complete search history.

(56) References Cited

U.S. PATENT DOCUMENTS

| | | | |
|---|---|---|---|
| 241,991 A * | 5/1881 | Jones | A47G 1/20 248/222.51 |
| 365,725 A | 6/1887 | Buckland | |
| 600,255 A | 3/1898 | Breul | |
| 738,074 A | 9/1903 | Schick | |
| 739,512 A | 9/1903 | Stannard | |
| 745,728 A * | 12/1903 | Jung | F16B 13/0808 411/342 |
| 1,100,170 A | 6/1914 | Brosius | |
| 1,115,800 A | 11/1914 | Froberg | |
| 1,132,414 A | 3/1915 | White | |
| 1,159,420 A | 11/1915 | Rubly | |
| 1,161,268 A | 11/1915 | Tuck | |
| 1,168,257 A | 1/1916 | Kennedy | |
| 1,185,587 A | 5/1916 | Bragg | |
| 1,210,610 A | 1/1917 | Dehn | |
| 1,333,692 A | 3/1920 | Wester | |
| 1,335,881 A | 4/1920 | Dottl | |
| 1,389,540 A | 8/1921 | Washington | |
| 1,409,291 A | 3/1922 | Giroux | |
| 1,573,557 A | 2/1926 | Alexander | |
| 1,637,981 A | 8/1927 | Baldwin | |
| 1,670,398 A | 5/1928 | Silvino | |
| 1,676,197 A | 7/1928 | Marrinan | |
| 1,780,474 A | 11/1930 | Glazer | |
| 1,802,934 A | 4/1931 | Balch | |
| 1,999,575 A | 4/1935 | Reuter et al. | |
| 2,193,306 A | 3/1940 | Tinnerman | |
| 2,282,631 A | 5/1942 | Winship | |
| 2,339,841 A | 1/1944 | Deuchler et al. | |
| 2,408,366 A | 10/1946 | Boyer | |
| 2,698,470 A | 1/1955 | Buedingen | |
| 2,751,807 A | 6/1956 | Harre | |
| 2,789,783 A | 4/1957 | Jones | |
| 2,883,946 A | 4/1959 | Van Kleef | |
| 2,908,196 A | 10/1959 | Apfelzweig | |
| 2,916,235 A | 12/1959 | Nagel | |
| 3,020,602 A | 2/1962 | Siering | |
| 3,069,122 A | 12/1962 | Babajoff | |
| 3,127,807 A | 4/1964 | Modrey | |
| 3,143,915 A | 8/1964 | Tendler | |
| 3,219,302 A * | 11/1965 | Smith | A47G 1/20 248/218.3 |
| 3,248,994 A | 5/1966 | Mortensen | |
| 3,268,195 A | 8/1966 | Hoffman | |
| 3,282,547 A | 11/1966 | Ables | |
| 3,288,014 A | 11/1966 | Aackersberg | |
| 3,298,651 A | 1/1967 | Passer | |
| 3,302,508 A | 2/1967 | Topf | |
| 3,312,442 A | 4/1967 | Moeller | |
| 3,385,156 A | 5/1968 | Polos | |
| 3,477,677 A | 11/1969 | Hindley | |
| 3,547,389 A | 12/1970 | Mitchell | |
| 3,605,547 A | 9/1971 | Millet | |
| 3,618,447 A | 11/1971 | Goins | |
| 3,645,163 A | 2/1972 | Byland | |
| 3,707,898 A | 1/1973 | Holly | |
| 3,752,030 A | 8/1973 | Steurer | |
| 3,861,631 A | 1/1975 | Shorin | |
| 3,879,006 A | 4/1975 | Staudte, Jr. | |
| 3,891,176 A | 6/1975 | Downing et al. | |
| 3,895,773 A | 7/1975 | Solo | |
| 3,912,211 A | 10/1975 | Topf | |
| 3,926,394 A | 12/1975 | Mauceri et al. | |
| 3,966,157 A | 6/1976 | Corral et al. | |
| 4,043,245 A | 8/1977 | Kaplan | |
| 4,075,924 A | 2/1978 | McSherry et al. | |
| 4,103,854 A | 8/1978 | Pliml et al. | |
| 4,105,179 A * | 8/1978 | Elliott | A47F 5/0823 248/220.43 |
| 4,120,231 A | 8/1978 | Neumayer | |
| 4,181,061 A | 1/1980 | McSherry | |
| 4,196,883 A * | 4/1980 | Einhorn | F16B 13/003 248/546 |
| D259,700 S | 6/1981 | Chasen | |
| 4,274,324 A | 6/1981 | Gianuzzi | |
| 4,285,264 A | 8/1981 | Einhorn | |
| 4,286,497 A | 9/1981 | Shamah | |
| 4,294,156 A | 10/1981 | McSherry et al. | |
| 4,300,745 A | 11/1981 | Peterson | |
| 4,325,528 A | 4/1982 | Martin | |
| 4,406,108 A | 9/1983 | Beck et al. | |
| 4,422,608 A * | 12/1983 | Hogg | A47F 5/0823 248/205.4 |
| 4,432,683 A | 2/1984 | Polos | |
| 4,485,995 A * | 12/1984 | Hogg | A47F 5/0823 248/218.1 |
| 4,509,713 A * | 4/1985 | Hogg | A47G 1/20 248/217.4 |
| 4,573,844 A | 3/1986 | Smith | |
| D170,196 S | 8/1986 | Gries | |
| 4,613,108 A | 9/1986 | Sundstrom et al. | |
| 4,619,430 A * | 10/1986 | Hogg | A47F 5/0823 248/216.1 |
| 4,650,386 A | 3/1987 | McSherry et al. | |
| 4,664,350 A | 5/1987 | Dodds et al. | |
| 4,697,669 A * | 10/1987 | Bergsten | E06C 9/04 182/189 |
| 4,697,969 A | 10/1987 | Sparkes | |
| 4,719,917 A | 1/1988 | Barrows et al. | |
| 4,821,992 A | 4/1989 | Johnson | |
| 4,822,226 A | 4/1989 | Kennedy | |
| 4,828,439 A | 5/1989 | Giannuzzi | |
| D301,975 S | 7/1989 | Mullen | |
| 4,871,140 A | 10/1989 | Hoskinson et al. | |
| 5,028,030 A | 7/1991 | Lewis | |
| 5,048,788 A | 9/1991 | Lorincz | |
| 5,059,077 A | 10/1991 | Schmid | |
| 5,067,864 A | 11/1991 | Dewey et al. | |
| 5,149,037 A * | 9/1992 | Smith | A47F 5/0876 248/216.1 |
| 5,165,640 A * | 11/1992 | Williams, 3rd | A47F 5/0823 248/220.43 |
| 5,215,418 A | 6/1993 | Trainer et al. | |
| 5,221,169 A | 6/1993 | McSherry et al. | |
| 5,236,293 A | 8/1993 | McSherry et al. | |
| D339,980 S | 10/1993 | Sheehan | |
| D342,016 S * | 12/1993 | Ziegelmann | A47F 5/0823 D30/154 |
| 5,267,718 A | 12/1993 | Sheehan | |
| 5,267,719 A | 12/1993 | Keller | |
| 5,308,203 A | 5/1994 | McSherry et al. | |
| 5,322,401 A | 6/1994 | Vernet | |
| 5,437,429 A | 8/1995 | Atlas | |
| 5,447,005 A | 9/1995 | Giannuzzi | |
| 5,529,449 A | 6/1996 | McSherry et al. | |
| 5,536,121 A | 7/1996 | McSherry | |
| 5,584,462 A | 12/1996 | Reese | |
| 5,596,792 A | 1/1997 | Shelton | |
| D378,052 S | 2/1997 | Perreault | |
| D381,892 S | 8/1997 | Porter et al. | |

(56) References Cited

U.S. PATENT DOCUMENTS

| | | | |
|---|---|---|---|
| 5,702,218 A | 12/1997 | Onofrio | |
| 5,725,302 A | 3/1998 | Sirkin | |
| 5,752,792 A | 5/1998 | McSherry | |
| 5,755,545 A | 5/1998 | Banks | |
| 5,833,415 A | 11/1998 | McSherry | |
| D404,287 S | 1/1999 | Hepworth | |
| 5,876,169 A | 3/1999 | Wrigley | |
| 5,878,988 A | 3/1999 | Rakower | |
| 5,881,982 A | 3/1999 | Hollingsworth et al. | |
| D409,082 S | 5/1999 | Donahue | |
| 5,944,295 A | 8/1999 | McSherry | |
| D417,385 S | 12/1999 | Bries et al. | |
| 6,036,149 A | 3/2000 | Del Pino et al. | |
| D424,816 S | 5/2000 | Snell | |
| 6,126,126 A | 10/2000 | McKiernan, Jr. | |
| 6,250,865 B1* | 6/2001 | McSherry | F16B 13/0808 411/29 |
| 6,279,862 B1 | 8/2001 | Gershowitz | |
| D457,419 S | 5/2002 | McSherry et al. | |
| 6,419,436 B1 | 7/2002 | Gaudron | |
| 6,431,510 B1 | 8/2002 | Lydecker et al. | |
| 6,435,789 B2 | 8/2002 | Gaudron | |
| D462,895 S | 9/2002 | Gaudron | |
| 6,457,926 B1 | 10/2002 | Pope | |
| D473,451 S | 4/2003 | Goodman et al. | |
| D480,292 S | 10/2003 | Johansson et al. | |
| D480,625 S | 10/2003 | Snell | |
| D486,057 S | 2/2004 | Chen | |
| 6,695,276 B2* | 2/2004 | Skorka | A47G 1/20 248/217.1 |
| D493,699 S | 8/2004 | Goodman et al. | |
| D494,452 S | 8/2004 | Sheldon et al. | |
| 6,821,069 B2 | 11/2004 | Ikuta | |
| 6,830,228 B2 | 12/2004 | Ernst | |
| 6,884,012 B2 | 4/2005 | Panasik | |
| 6,969,220 B2 | 11/2005 | Anquetin | |
| D515,911 S | 2/2006 | McDuff | |
| D516,412 S | 3/2006 | McDuff | |
| 7,160,074 B2 | 1/2007 | Ernst et al. | |
| D554,481 S | 11/2007 | Newbould et al. | |
| D554,483 S | 11/2007 | Hager et al. | |
| D557,595 S | 12/2007 | Ernst et al. | |
| 7,320,569 B2 | 1/2008 | Kaye et al. | |
| D566,532 S | 4/2008 | Wolff | |
| 7,395,998 B2 | 7/2008 | Peterson | |
| D593,141 S | 5/2009 | Gaudron | |
| 7,540,458 B2 | 6/2009 | Forbes | |
| 7,547,171 B2* | 6/2009 | McDuff | A47G 1/20 411/400 |
| D596,930 S | 7/2009 | Gaudron | |
| D605,933 S | 12/2009 | Gaudron | |
| D607,311 S | 1/2010 | Snider | |
| 7,694,401 B2 | 4/2010 | Peterson | |
| 7,713,013 B2 | 5/2010 | Sedgwick et al. | |
| D626,403 S | 11/2010 | Portz | |
| D630,088 S | 1/2011 | Kim | |
| D630,089 S | 1/2011 | Kim | |
| D635,843 S * | 4/2011 | McDuff | D8/367 |
| D636,256 S | 4/2011 | McDuff et al. | |
| D642,900 S | 8/2011 | McDuff et al. | |
| 8,011,080 B2* | 9/2011 | Brown | F16B 13/001 29/525.01 |
| D649,022 S * | 11/2011 | McDuff | D8/367 |
| D649,023 S | 11/2011 | McDuff et al. | |
| D649,436 S | 11/2011 | McDuff et al. | |
| D649,437 S | 11/2011 | McDuff et al. | |
| D649,438 S | 11/2011 | McDuff et al. | |
| D649,439 S | 11/2011 | McDuff et al. | |
| D650,261 S | 12/2011 | McDuff et al. | |
| 8,109,705 B1 | 2/2012 | Brown et al. | |
| 8,303,224 B2 | 11/2012 | McDuff et al. | |
| 8,414,239 B2 | 4/2013 | McDuff | |
| 8,449,236 B2 | 5/2013 | McDuff et al. | |
| 8,573,913 B2 | 11/2013 | McDuff | |
| 8,821,094 B2 | 9/2014 | McDuff et al. | |
| 8,974,166 B2 | 3/2015 | McDuff | |
| 9,044,110 B2* | 6/2015 | McDuff | A47G 1/20 |
| D800,543 S * | 10/2017 | Mangeri | D8/367 |
| D822,466 S * | 7/2018 | Mangeri | F16B 13/0808 D8/367 |
| 2001/0046429 A1 | 11/2001 | Gaudron | |
| 2002/0015629 A1 | 2/2002 | Ito | |
| 2002/0171017 A1 | 11/2002 | McKeirnan et al. | |
| 2004/0170486 A1 | 9/2004 | Demeo | |
| 2006/0134375 A1 | 6/2006 | Peterson | |
| 2006/0182517 A1 | 8/2006 | McDuff | |
| 2007/0124910 A1 | 6/2007 | Peterson et al. | |
| 2007/0235622 A1 | 10/2007 | Baran et al. | |
| 2008/0115343 A1 | 5/2008 | Peterson | |
| 2008/0253860 A1 | 10/2008 | McDuff et al. | |
| 2009/0003962 A1* | 1/2009 | McDuff et al. | F16B 13/0808 411/344 |
| 2009/0269158 A1 | 10/2009 | McDuff et al. | |
| 2010/0005756 A1 | 1/2010 | McDuff | |
| 2010/0219307 A1 | 9/2010 | Ernst et al. | |
| 2012/0001039 A1* | 1/2012 | McDuff | F16B 45/00 248/216.1 |
| 2012/0001040 A1 | 1/2012 | McDuff et al. | |
| 2013/0243546 A1 | 9/2013 | McDuff et al. | |
| 2013/0343831 A1 | 12/2013 | McDuff et al. | |
| 2014/0199132 A1 | 7/2014 | McDuff | |
| 2015/0110574 A1 | 4/2015 | McDuff et al. | |
| 2015/0377411 A1 | 12/2015 | McDuff et al. | |
| 2016/0215922 A1* | 7/2016 | McDuff | F16M 13/02 |
| 2019/0063671 A1* | 2/2019 | McDuff | F16M 13/02 |

FOREIGN PATENT DOCUMENTS

| | | |
|---|---|---|
| CA | 2458320 A1 | 8/2004 |
| CA | 2420718 A1 | 9/2004 |
| CA | 2518085 A1 | 9/2004 |
| CA | 2643664 A1 | 4/2010 |
| CH | 491296 | 5/1970 |
| CN | 1384293 | 12/2002 |
| CN | 2572104 Y | 9/2003 |
| CN | 2623930 Y | 7/2004 |
| CN | 200961609 Y | 10/2007 |
| DE | 1296883 B | 6/1969 |
| DE | 10051987 A1 | 5/2002 |
| EP | 0713981 A1 | 5/1996 |
| EP | 1346675 A1 | 9/2003 |
| JP | 7174124 | 7/1995 |
| JP | 2003531344 A | 10/2003 |
| WO | 9400702 A1 | 1/1994 |
| WO | 9602170 | 2/1996 |
| WO | 9616273 | 5/1996 |
| WO | 9905419 | 2/1999 |
| WO | WO-0025030 A1 * | 5/2000 ............ F16B 13/08 |
| WO | 2004079209 A1 | 9/2004 |

* cited by examiner

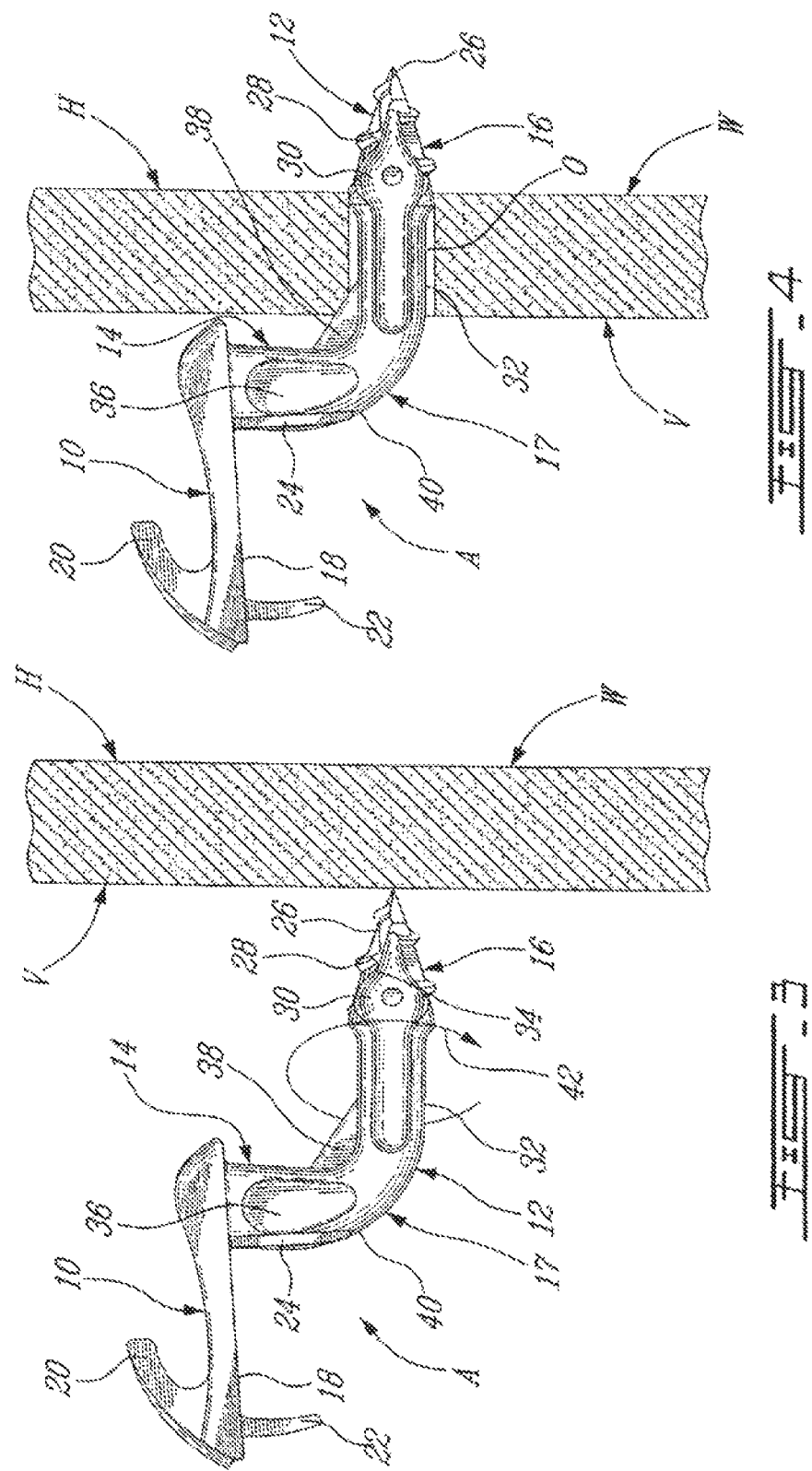

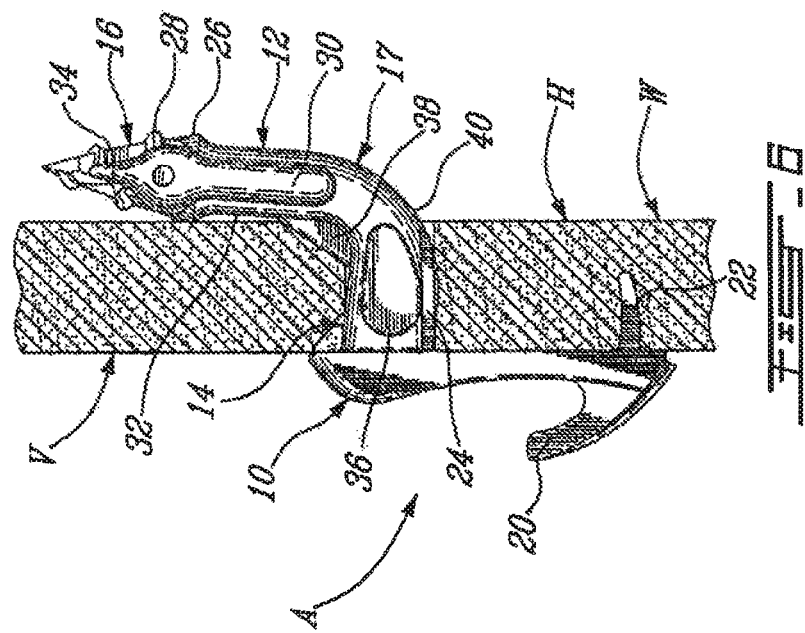
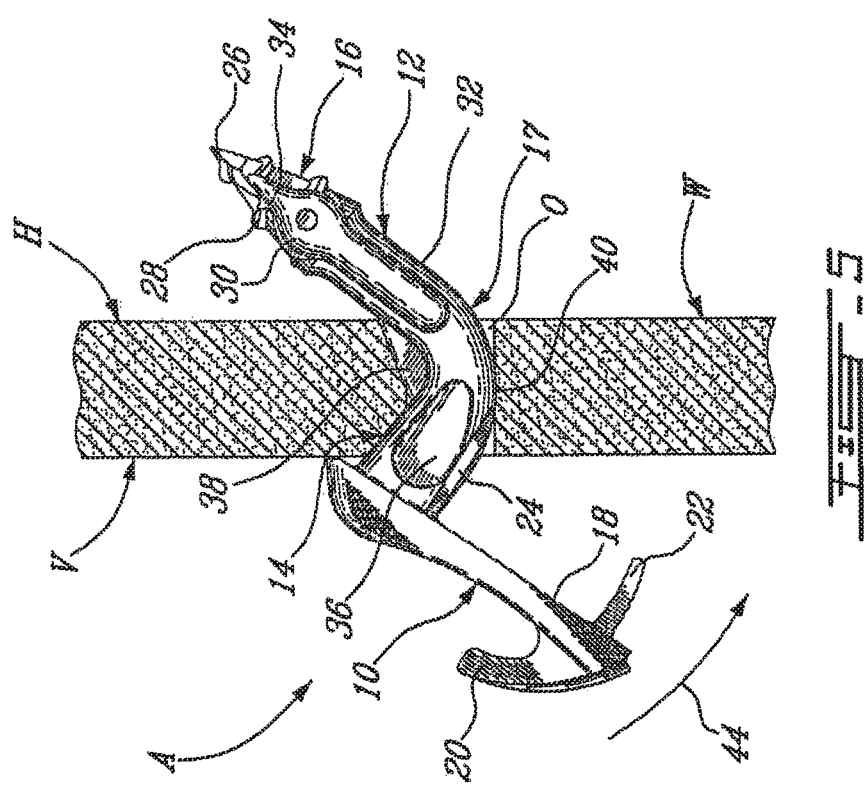

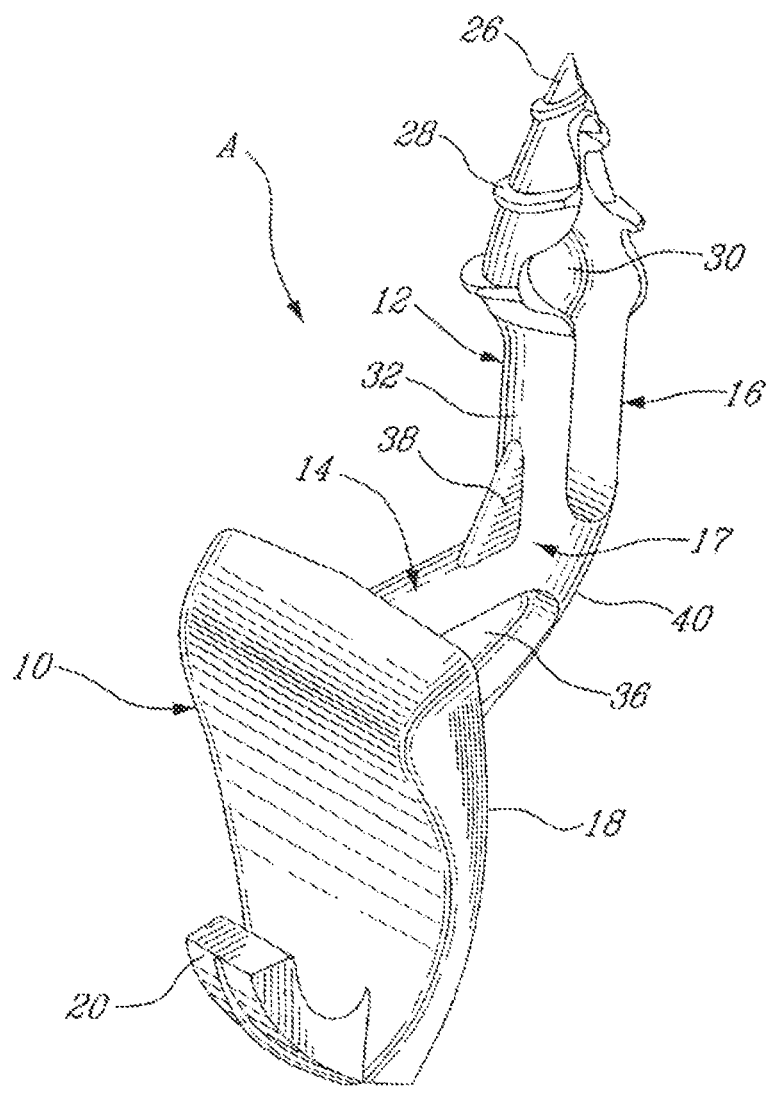

WALL-MOUNTED HOOK

CROSS REFERENCE TO RELATED APPLICATIONS

This Application is a continuation of U.S. patent application Ser. No. 13/126,878 filed on Sep. 20, 2011, which is a 371 National Phase Filing of International Application No. PCT/CA2009/001572 filed on Oct. 30, 2009, which claims priority on Canadian Patent Application No. 2,643,664 filed on Oct. 30, 2008 and on U.S. Provisional Patent Application No. 61/193,256 filed on Nov. 12, 2008, which are herein incorporated by reference.

FIELD OF THE INVENTION

The present invention relates to hangers for supporting objects on a wall and, more particularly, to a hook and anchor assembly for attachment to hollow walls, such as wallboards which typically comprise a relatively thick layer of gypsum sandwiched between paper layers.

BACKGROUND OF THE INVENTION

U.S. Pat. No. 3,219,302 issued to Smith on Nov. 23, 1965 teaches a hanger 10 of stiff yet flexible wire construction engaged through a wall 11. The curved portion 16 exerts pressure on the inside wall surface and pulls a leg portion 14 of the hanger against the front or inner surface of the wall and thus into firm or even locked relationship therewith. The hanger 10 includes an engagement portion 19 which is threaded to receive a nut 20 thereon for reasons which are unclear. Perhaps, the nut 20 acts as a lip to retain the wire of a picture hanging from section 19 of the hanger 10. Various terminal endings for the hangers are shown in FIGS. 2 to 4. In this patent, the nut 20 is not used to tighten the hanger 10 against the wall.

U.S. Pat. No. 4,325,528 issued to Martin on Apr. 20, 1982 discloses a bracket which has a pointed end and an elbow, and the installation steps thereof are shown in FIGS. 2 to 4. The bracket appears to be sufficiently fixed in this patent without having to be engaged by a distinct component in view of its portion 2 abutting the wall W.

U.S. Pat. No. 4,509,713 issued to Hogg on Apr. 9, 1985, U.S. Pat. No. 2,789,783 issued to Jones on Apr. 23, 1957 and U.S. Pat. No. 5,028,030 issued to Lewis on Jul. 2, 1991 are similar in each disclosing a hanger which includes an arcuate section having a pointed distal end which is driven through the wall while rotating the hanger until a flange thereof abuts the inside or front wall with a hook being provided proximally of this flange. In Lewis, there is no flange but the hook acts as both an abutment on the inner surface of the wall as well as a component for hanging pictures.

U.S. Pat. No. 2,408,366 issued to Boyer on Oct. 1, 1946 discloses a toggle bolt consisting of a threaded bolt portion 10 and a L-shaped toggle 16 displaceable relative to the bolt portion 10 between axially and perpendicularly oriented positions, as seen in FIGS. 1 and 2, respectively. The assembly of the bolt portion 10 and the toggle 16 is inserted through an opening 23 defined in an article 22 and the toggle 16 is then rotated to assume its position of FIG. 2. The bolt portion 10 is then held stationary by engaging a screw driver in a slot 24 defined at the proximal end of the bolt portion 10 while a nut 21 is rotated against a concave washer 20 so as to compress a gasket 19. The assembly then becomes firmly secured to the article 22. In FIG. 5, an article 25 is shown held firmly against a supporting wall 26 by way of the general bolt and toggle assembly described hereinbefore. The construction of this toggle bolt results from the assembly of a number of components.

PCT Publication No. WO-00/25030 published on May 4, 2000 in the name of Cobra Fixations Cie Ltée—Cobra Anchors Co. Ltd. discloses a hook (H, H") and anchor (A, A") assembly for use with hollow panels (W) such as walls and ceilings made of gypsum. The assembly includes an anchor (A, A") having first (10, 80/88) and second (12, 90) sections, a hook (H, H") adapted to be secured to the anchor (A, A") and to abut a visible surface (O) of the hollow wall (W). The anchor (A, A") is adapted to be engaged to the hollow wall (W) such that its second section (12, 90) is located behind the wall (W) with the first section (10, 56, 80/88) extending through a hole defined in the wall (W). The hook (H, H") has a wall-engaging flange (44, 94). The hook (H, H") and the first section (10, 80/88) of the anchor (A, A") are provided with adjustable cooperating threads for connecting them together while allowing for various relative positions therebetween, whereby the distance between the second section (12, 90) and the wall engaging flange (44, 94) may be varied such that the second section (12, 90) and the wall engaging flange (44, 94) act as a vice on the wall (W) for tightly installing the anchor (A, A") and the hook (H, H") thereon. Also, the anchor (A') may comprise successive first and second sections (54, 56) having different threads with the first section (54) being adapted to be engaged in a wooden member and with the hook being adapted to be engaged to the second section (56) such as to abut the wooden member.

In spite of these various devices, there remains a need for a wall-mounted anchor of the type described hereinafter.

SUMMARY OF THE INVENTION

It is therefore an aim of the present invention to provide a novel wall-mounted anchor for hollow walls.

Therefore, in accordance with the present invention, there is provided an anchor assembly for use with hollow panels, comprising a holding member and an anchor, the anchor being adapted to penetrate a hollow panel and, once the anchor assembly has been installed to the hollow panel, to be secured thereto while the holding member, which is joined to the anchor, is located on a visible side of the hollow panel, the anchor includes a first and a second portion, the first portion, when the anchor assembly is installed to the hollow panel, extending through a hole defined in the panel while the second portion is located behind the panel, an elbow portion being provided on the anchor between the first and second portions for allowing the anchor to be pivoted when being installed in the panel from a first position where the second portion is inserted though the panel to form the hole therein and a second position where the second portion extends behind.

Other objects, advantages and features of the present invention will become more apparent upon reading of the following non-restrictive description of embodiments thereof, given by way of example only with reference to the accompanying drawings.

BRIEF DESCRIPTION OF THE DRAWINGS

Reference will now be made to the accompanying drawings, showing by way of illustration an illustrative embodiment of the present invention, and in which:

FIGS. 3 to 6 are successive partly cross-sectional side elevation views showing the installation of the wall anchor assembly of FIGS. 1 and 2 into a wall; and FIG. 7 is a perspective view of the wall anchor assembly of FIG. 1.

DESCRIPTION OF ILLUSTRATIVE EMBODIMENTS OF THE INVENTION

Turning to the figures of the appended drawings, a wall anchor assembly A according to an embodiment of the present invention will be described.

Figure 1:
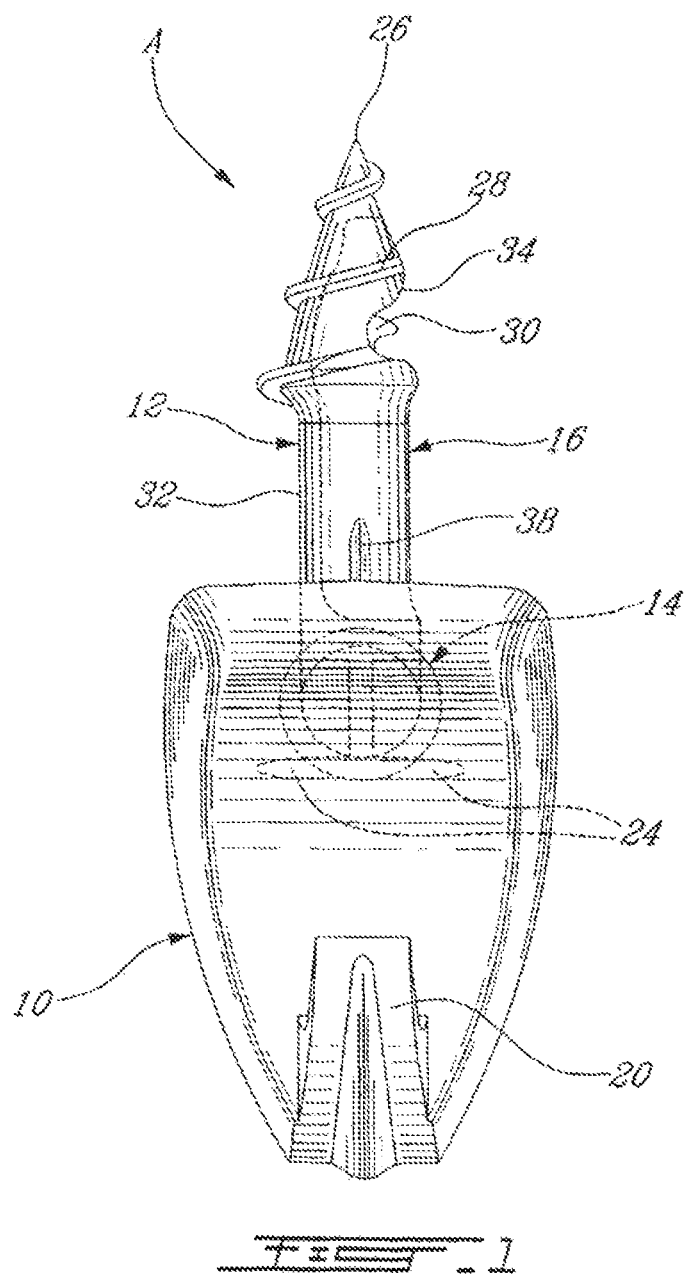
FIG. 1 is a front elevation view of a wall anchor assembly in accordance with an embodiment of the present invention.
Figure 2:
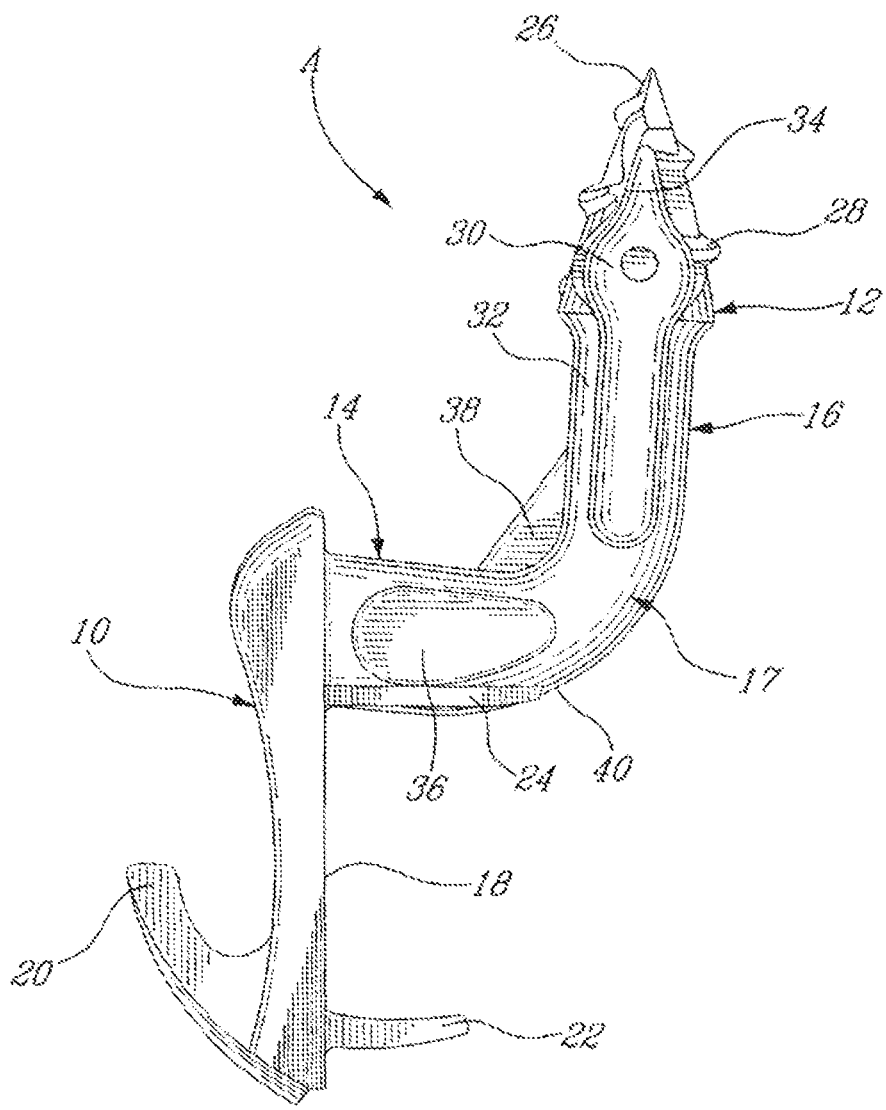
FIG. 2 is a right side elevation view of the wall anchor assembly of FIG. 1.

FIGS. 1, 2 and 7 illustrate the anchor assembly A in isolation. The anchor assembly A is adapted to be mounted in a vice-like fashion to a hollow wall W, such as will be described hereinbelow with reference to FIGS. 3 to 6. The wall W is typically a hollow wall, such as a wallboard, that is a thick gypsum layer coated on each side thereof with a paper layer.

The anchor assembly A includes a hook 10 and an anchor 12, which are herein made of unitary construction, for instance via a molding process. The hook 10 herein remains visible after the anchor assembly A has been mounted to the wall W, typically abutting a visible surface V of the hollow wall W. It is understood that the hook 10 can be replaced by other suitable components depending on the intended use of the anchor assembly A.

The anchor 12 has a general elbowed configuration and, more particularly, comprises a head portion 14 (first portion) adapted to extend through a hole O defined in the wall W and a vice portion 16 (second portion) extending substantially at right angles from the head portion 14 as a result of an elbow portion 17 being mergingly provided therebetween. The anchor 12 is adapted to be engaged to the hollow wall W such that the vice portion 16 is located behind the wall W and abuts a hidden surface H of the wall W, with the head portion 14 extending through the hole O defined in the wall W, this hole O being formed during the installation of the anchor assembly A.

The distance between a rear surface 18 of the hook 10 and the vice portion 16 of the anchor 12 substantially corresponds to a thickness of the wall W (i.e. the distance between the visible and hidden surfaces V and H of the wall W), such as to act as a vice on the wall W for tightly installing the anchor assembly A thereto.

The hook 10 includes a hook member 20, and is also provided with a spike 22 that extends rearwardly from the rear surface 20 thereof for engagement into the wall W (see FIG. 6), as will be described in more details hereinbelow.

The head portion 14 of the anchor 12 includes a pair of lateral fins 24 that extend outwardly from opposite sides of the head portion 14. The head portion 14 also defines a pair of depressions 36 on opposite sides thereof and adjacent to the fins 24.

The vice portion 16 includes a pointed distal end 26 having a conical shape and being typically provided on an outer surface thereof with a male thread 28. The vice portion 16 also includes a generally cylindrical section 32. The pointed distal end 26 and the cylindrical section 32 define a channel 30.

The pointed distal end 26 is used to perforate the gypsum wall by manual rotation of the anchor assembly A with the male thread 28 providing assistance for gradually introducing again by rotation, the distal end 26 in the wall W until the distal end 26 has extended through the wall W. The configuration of the distal end 26 renders easy and substantially effortless the introduction of the vice portion 16 in and through the wall W.

The distal end 26 defines a leading cutting edge 34 which easily cuts through the paper and the gypsum layers of the hollow wall W and which directs debris from the wall W into the channel 30. Indeed, the channel 30 collects the gypsum wall debris instead of forcing these debris outwardly of the vice portion 16.

The elbow portion 17 of the anchor 12 causes the latter to deviate sideways with respect to an axis of the head portion 14 such that the vice portion 16 ends up extending substantially parallel to the wall W and is in position to abut the hidden surface H of the wall W, in vice-like fashion, when the anchor assembly A is installed in the wall W.

The anchor 12 also includes an outwardly directed vertical fin 38 located on the inside of the elbow portion 17 and connected to both the head and vice portions 14 and 16. The anchor 12 further defines a cam surface 40 that will be explained in detail hereinbelow.

FIGS. 3 to 6 show the installation of the anchor assembly A in the wall W. In FIG. 3, the anchor assembly A is rotated, as per arrow 42, in engagement with and into the wall W such that the vice portion 16 defines the hole O in the wall, as seen in FIG. 4. The anchor assembly A is then rotated along arrow 44, as shown in FIG. 5 wherein the elbow portion 17 is engaged in the hole O. FIG. 6 illustrates the final position of the anchor assembly A in the wall W.

During the installation, the distal end 26 of the anchor 12 forms the hole O, i.e. a calibrated hole, for the anchor assembly A to be inserted and secured into position.

The clearing channel 30 will guide the displaced friable material (plaster) from the wall W out of the hole O, during the drilling process.

The <<L>> shape of the anchor 12 is designed such that it will locate behind the friable material (drywall), i.e. the wall W, and maximize the bearing surface to increase the load capacity.

The cam surface 40 is designed such that during the rotational movement of the anchor assembly A and insertion in the drilled hole O, it will raise the anchor assembly A (see FIG. 5) and position the anchor assembly A such that it will cover completely the drilled hole O and will fill the drilled hole O in order to use the entire surface of the hole O as a bearing surface when load is applied on the anchor assembly A, typically via the hook 10 thereof.

The reinforcement or vertical fin 38 increases the strength of the anchor assembly A and will locate and embed into the drywall W when the anchor assembly A reaches its final installation position (see FIG. 6). This will prevent rotational movement of the anchor assembly A, with respect to the wall W, once installed and loaded.

The two lateral fins 24 are adapted to increase the holding resistance of the anchor assembly A in the drywall W, in that they increase the load surfaces bearing on the drywall material when weight is applied on the hook 10 and produces downward forces on the anchor 12 and the head portion 14 thereof located in the wall W.

The positioning and stabilizing spike 22, once the anchor assembly A has been inserted into the drilled hole O, positions and secures the anchor assembly A in the rotational axes, in addition to adding strength and grip to the anchor assembly A.

The anchor 12 is designed to allow for it to be pivoted from its positions in FIG. 4 to FIG. 6, once the distal end 26 has defined the hole in the wall W and has completely passed therethrough, from a position where the vice portion 16 is co-axial with an axis of the hole O defined in the wall W (FIG. 4) to the vice position of the vice portion 16 shown in FIG. 6. The anchor 12 is designed to prevent damage to the hole O defined in the wall W when the anchor 12 is pivoted therein, and until the head portion 14 has been translationally fitted into the hole O. The head portion 14 can slightly taper from the hook 10 towards the elbow portion 17 for fitting tightly in the hole O in the wall W.

As previously mentioned, the hook 10 can take various forms of holding members, including forms other than that of a "hook" per se, such as holding systems of all kinds, e.g. for securing towel racks, plant holders, mirrors, shelving, etc.

Although the present invention has been described hereinabove by way of embodiments thereof, it may be modified, without departing from the nature and teachings of the subject invention as described herein.

The invention claimed is:

1. An anchor assembly for use with hollow panels, the anchor assembly comprising a holding member and an anchor, the anchor being adapted to penetrate a hollow panel and, once the anchor assembly has been installed to the hollow panel, to be secured thereto while the holding member which is joined to the anchor, is adapted to be located on a visible side of the hollow panel, the anchor includes a first portion and a second portion, the first portion, when the anchor assembly is installed to the hollow panel, being adapted to extend through a hole defined in the hollow panel while the second portion is adapted to be located behind the hollow panel, an elbow portion being provided on the anchor between the first and second portions for allowing the anchor to be pivoted when being installed in the hollow panel from a first position where the second portion is inserted through the hollow panel to form the hole therein to a second position where the second portion extends behind the hollow panel and in abutment therewith and the first portion is lodged in the hole, wherein a substantially vertical fin extends from an inside surface of the elbow portion and within a concavity of the elbow portion, the substantially vertical fin, when the anchor is installed in the hollow panel, being adapted to be lodged in the hollow panel on a side thereof opposite the holding member.

2. The anchor assembly according to claim 1, wherein the substantially vertical fin defines a free cutting edge for facilitating an engagement thereof in the hollow panel.

3. The anchor assembly according to claim 1, wherein the substantially vertical fin is adapted to prevent rotation of the anchor assembly when the anchor is installed in the hollow panel.

4. The anchor assembly according to claim 1, wherein the substantially vertical fin is adapted to provide reinforcement to the anchor.

* * * * *